United States Patent [19]
Sumpter et al.

[11] Patent Number: 5,122,585
[45] Date of Patent: Jun. 16, 1992

[54] ONE PART HEAT CURABLE ORGANOPOLYSILOXANE COMPOSITIONS

[75] Inventors: Chris A. Sumpter, Clifton Park; Larry N. Lewis, Scotia, both of N.Y.

[73] Assignee: General Electric Company, Schenectady, N.Y.

[21] Appl. No.: 624,950

[22] Filed: Dec. 10, 1990

[51] Int. Cl.$^5$ .............................................. C08G 77/06
[52] U.S. Cl. ........................................ 528/15; 525/478
[58] Field of Search ................................... 528/15, 478

[56] References Cited

U.S. PATENT DOCUMENTS

| | | |
|---|---|---|
| 4,670,531 | Eckberg | 528/15 |
| 4,939,065 | Cavezzan et al. | 522/28 |
| 5,036,117 | Chung et al. | 528/15 |

*Primary Examiner*—Melvyn I. Marquis
*Attorney, Agent, or Firm*—William A. Teoli; James C. Davis, Jr.; William H. Pittman

[57] ABSTRACT

One part heat curable organopolysiloxane compositions are provided which utilize a vinyl containing organopolysiloxane composition, a siloxane hydride, an effective amount of a platinum group metal catalyst and a sufficient amount of an azodicarbonyl compound as an inhibitor which is free of ester linkages.

7 Claims, No Drawings

ONE PART HEAT CURABLE ORGANOPOLYSILOXANE COMPOSITIONS

BACKGROUND OF THE INVENTION

The present invention relates to one part heat curable organopolysiloxane compositions having improved shelf stability. More particularly, the present invention relates to the employment of certain azo inhibitors in a platinum group metal catalyzed one part heat curable organopolysiloxane composition.

Prior to the present invention, as shown by Eckberg, U.S. Pat. No. 4, 670,531 and Cavezzan et al, U.S. Pat. No. 4,640,939, azodicarboxylates, such as dialkylazodicarboxylates were used to inhibit reaction between an organopolysiloxane base polymer having olefinically unsaturated organic radicals and an organohydrogenpolysiloxane which were catalyzed by an effective amount of a precious metal containing catalyst, such as platinum. Although valuable results can be achieved by the use of such dialkylazodicarboxylate inhibitors, experience has shown that the shelf life of the resulting heat curable organopolysiloxane compositions is often insufficient to satisfy the requirements for many heat curable organopolysiloxane composition applications. Accordingly, additional inhibitors are constantly being sought by the silicone industry to extend the shelf life of one part heat curable organopolysiloxane compositions.

SUMMARY OF THE INVENTION

The present invention is based on the discovery that azo compounds included within the formula,

where Q is a member selected from R and $-N-(R^1)_2$, R is a $C_{(6-13)}$ aromatic organic radical, and $R^1$ is a $C_{(1-13)}$ organic radical, have been found to be particularly effective as cure inhibitors when utilized in effective amounts in one part heat curable platinum group metal catalyzed organopolysiloxane compositions. Unexpectedly, substantially enhanced shelf stability at ambient temperatures have been found when azo compounds of formula 1 are used as inhibitors in place of the dialkylazodicarboxylates in precious metal catalyzed organopolysiloxane compositions, such as shown by Eckberg in U.S. Patent 4,670,531.

STATEMENT OF THE INVENTION

There is provided by the present invention, a one part heat curable organopolysiloxane composition comprising by weight:

(A) 100 parts of a vinyl substituted organopolysiloxane fluid,
(B) 1 to 20 parts of a siloxane hydride,
(C) an amount of a platinum group metal catalyst, which is effective as a hydrosilylation catalyst, and
(D) an amount of an azo compound of formula (1) which is effective as a hydrosilylation inhibitor.

Some of the azo compounds included within formula 1 which can be employed as inhibitors in the practice of the present invention are for example, azobistoluoyl (ABT), azobisbenzoyl (ABB) and azobis(N,N'-dimethylformamide) (ABDMF).

An effective amount of the azo compound referred to hereinafter as the inhibitor has been found to be 0.005% to 0.5% by weight, based on the weight of the one part heat curable mixture and preferably from 0.05% to 0.30% by weight.

The vinyl-substituted organopolysiloxane fluid, hereinafter referred to as the "vinylsiloxane" utilized in the one part heat curable organopolysiloxane compositions of the present invention can have a viscosity of from about 100 to 200,000 centipoises. Although vinyl substitution can be on the polysiloxane backbone, a preferred vinyl siloxane is included within the following formula:

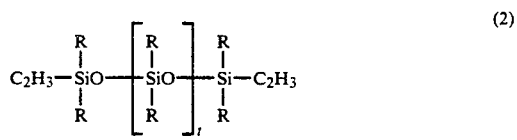

where $C_2H_3$ is vinyl, and R is selected from $C_{(1-13)}$ monovalent organic radicals free of olefinic unsaturation, and t is a positive integer having a value sufficient to provide a vinyl siloxane viscosity of from about 100 to 200,000 centipoises at 25° C. Preferably, R is selected from alkyl radicals of 1 to 8 carbon atoms, such as methyl, ethyl, propyl; monovalent aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula,

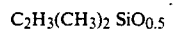

which can vary from about 0.05 to about 3.5 mole percent, based on the total chemically combined siloxy units and preferably from 0.14 to about 2 mole percent.

The vinylsiloxane of Formula (2) can be prepared by equilibrating cyclotetrasiloxane with a vinyl terminated low molecular weight polysiloxane chainstopper. However, if vinyl organosiloxy units are desired in the backbone, a predetermined amount of cyclic vinylorganosiloxane can be used in the equilibration mixture. The chainstopper is preferably a low molecular weight vinyl terminated organopolysiloxane, such as the corresponding disiloxane, trisiloxane, tetrasiloxane. These low molecular weight vinyl terminated polysiloxane polymers are produced by hydrolyzing the appropriate chlorosilane, particularly vinyldiorganochlorosilane, along with diorganodichlorosilane to produce the desired vinyl chainstopped polydiorganosiloxanes. The equilibration catalyst which can be used is preferably in acid catalyst, such as toluenesulfonic acid or an acid treated clay. An alkali metal hydroxide as the catalyst such as potassium or sodium hydroxide also can be used as the equilibration catalyst. When the equilibration has proceeded to the point where about 85% of the cyclopolysiloxane has been converted to linear polymer, the acid catalyst can be neutralized or filtered out. Preferably, excess cyclics are stripped off so that the linear polymer will have a low volatile content.

Included within the siloxane hydride is a "coupler", having the formula,

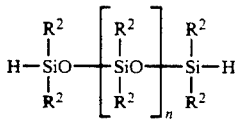
(3)

where $R^2$ is selected from $C_{(1-13)}$ monovalent organic radicals free of olefinic unsaturation and n is an integer having a value sufficient to provide the "coupler" with a viscosity of 1 to 500 centipoises at 25° C. and from about 3 to 9 mole percent of chainstopping diorganohydride siloxy units, based on the total moles of chemically combined siloxy units in the siloxane hydride.

In addition to the coupler of formula (3), the siloxane hydride used in the heat curable polysiloxane compositions of the present invention also can include siloxane hydride resins consisting essentially of the following chainstopping unit,

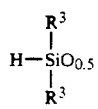

condensed with silicate ($SiO_2$) units, where the $R^3+H$ to Si ratio can vary from 1.0 to 2.7. A discussion of silicone resins is shown in Rochow Chemistry of the Silicones, pp. 90-94, Second Edition, John Wiley and Sons, New York, 1951, which is incorporated herein by reference. Siloxane hydride resins also can have the above condensed chainstopping units chemically combined with $SiO_2$ units and $(R^4)_2SiO$ units, where the $R^3+R^4+H$ to Si ratio can vary from 1.2 to 2.7, where $R^3$ and $R^4$ are $C_{(1-13)}$ monovalent organic radicals free of olefinic unsaturation and can be selected from $R^2$ radicals.

The siloxane hydride resins can be made by hydrolyzing the corresponding hydride chlorosilanes in the presence of an organic hydrocarbon solvent. To prepare resins having only monofunctional $(R^3)_3SiO_{0.5}$ units and tetrafunctional $SiO_2$ units, there can be cohydrolyzed a hydrogen diorganochlorosilane and tetrachlorosilane. Resins having monofunctional siloxy units, difunctional siloxy units, and tetrafunctional siloxy units, can be obtained by hydrolyzing a hydrogendiorganochlorosilane, tetrachlorosilane and a diorganodichlorosilane at particular rations. Additional siloxane hydride resins are shown by Jeram, U.S. Pat. No. 4,040,101 which is incorporated herein by reference.

The siloxane hydride also can include linear organopolysiloxane having the formula,

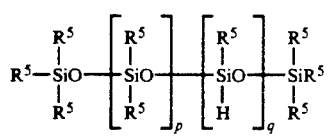
(4)

where $R^5$ is a $C_{(1-13)}$ monovalent organic radical free of olefinic unsaturation, and p and q are integers having values sufficient to provide a polymer having a viscosity of from 1 to 1,000 centipoises at 25° C., and wherein the siloxane hydride has from 0.04% to 1.4% by weight of hydrogen.

The siloxane hydride of formula (4) can be produced by equilibrating the appropriate hydrogencyclopolysiloxane with the appropriate cyclopolysiloxane containing $R^5$ substituent groups, in combination with low molecular weight linear triorganosiloxane chainstoppers.

In formulas (3) and (4), and the above siloxane hydride resins, the chemically combined units can have $R^2$, $R^3$, $R^4$ and $R^5$ radicals, which can be the same or different and are selected from alkyl radicals having from 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The siloxane hydride of formula (3) is prepared by either a hydrolysis process or by an acid catalyzed equilibration process. In the equilibration process, cyclopolysiloxane is equilibrated with a low molecular weight hydrogen terminated chainstopper, such as a dihydrogentetraorganodisiloxane. The acid catalyzed equilibration reaction is silimar to the method used for the production of the vinyl containing base polymer. In the hydrolysis process, hydrogendiorganochlorosilane is hydrolyzed with diorganodichlorosilanes to produce the polymer of formula (3). The resulting siloxane hydride can be separated from undesirable cyclics by stripping.

The platinum group metal catalysts employed in compositions of the present invention include those based on the metals rhodium, ruthenium, palladium, osmium, iridium and platinum. Especially preferred are the well known platinum and rhodium catalysts, such as the platinum hydrocarbon complexes described in U.S. Pat. Nos. 3,159,601 and 3,159,662 to Ashby, the platinum alcoholate catalysts described in U.S. Pat. No. 3,220, 970 to Lamoreaux, the platinum complexes of U.S. Pat. No. 3,814,730 to Karstedt, the platinum chlorideolefin complexes described in U.S. Pat. No. 3,516,946 to Modic and the rhodium complexes described in U.S. Pat. No. 4,262,107 to Eckberg, all of which are incorporated herein by reference.

An effective amount of the platinum group metal catalyst of the present invention is that amount which is sufficient to provide from 5 ppm to 200 ppm of platinum group metal based on the weight of heat curable organopolysiloxane compound composition, and preferably from 10 ppm to 100 ppm.

There can be incorporated in the heat curable organopolysiloxane compositions of the present invention from 5 to 100 parts by weight of a filler based on a 100 parts by weight of the vinyl siloxane. The filler can be selected from fumed silica, precipitated silica and mixtures thereof. Preferably less than 50 parts by weight of filler, per 100 parts by weight of the vinyl siloxane is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 200° C. and preferably 135° C. to 150° C.

In order that those skilled in the art will be better able to practice the present invention, the following examples are given by way of illustration and not by way of limitation. All parts are by weight.

EXAMPLE 1

A one part heat curable organopolysiloxane composition was made by adding 25 microliters (25 ppm platinum) of a platinum catalyst shown by Karstedt, U.S. Pat. 3,775,452, to a mixture of 50 grams of a polydimethylsiloxane fluid having a viscosity of 4,000 centipoise which was terminated by dimethylvinylsiloxy units and 50 mg of azobistoluoyl (ABT) which was added as a solution in methylene chloride. The resulting mixture was stripped of methylene chloride under vacuum leaving a homogeneous yellow brown silicone mixture. There was added 1.25 g of a silicon hydride fluid having a viscosity of 150 centipoise and 0.8 weight % hydrogen and consisting essentially of condensed dimethylsiloxy units and methylhydrogensiloxy units. The resulting mixture was stirred for approximately 2 minutes.

Additional formulations were prepared following the same procedure except that there was utilized in place of azobistoluoyl (ABT), azobisbenzoyl (ABB) and azobis(N,N'-dimethylformamide) (ABDMF). In addition to ABT, ABB and ADBDMF, a one part heat curable mixture was prepared utilizing a diisopropyl azodicarboxylate (DIAD) as shown by Eckberg, U.S. Pat. 4,670,531 and a ditertbutyl azodicarboxylate (DTAD). The various one part heat curable organopolysiloxane compositions were tested for rate of cure at 150° C. in a Sunshine gel timer, and stability at 50° C. (time to gelation) e.g. two weeks stability at 50° C. correlated to over 6 month room temperature stability.

The following results were obtained:

TABLE 1

| Inhibitor | Wt. % Level | Gel Time (150° C., sec) | 50° C. Stability (hours) |
|---|---|---|---|
| 1 ABT | 0.10 | 660 | >264 |
| 2 ABT | 0.12 | 1533 | >264 |
| 3 ABT | 0.15 | 2400 | >264 |
| 4 ABT | 0.20 | No gel | — |
| 4 ABB | 0.30 | 879 | >264 |
| 6 ABDMF | 0.10 | 727 | >288 |
| 7 ABDMF | 0.15 | 1348 | >264 |
| 8 ABDMF | 0.21 | No gel | — |
| 9 DTAD | 0.28 | 1126 | gel 120 |
| 10 DIAD | 0.30 | 2767 | gel 166 |

The above results show that the inhibitors of the present invention (1-8) are superior inhibitors for one part platinum catalyzed heat curable organopolysiloxan compositions as compared to the azodicarboxylate inhibitors (9-10) of the prior art.

Although the results as shown in the above example are directed to only a few of the very many variables which can be used to make the one part heat curable organopolysiloxane compositions of the present invention, it should be understood that the present invention is directed to the use of a much broader variety of materials which can be used in such one part heat curable organopolysiloxane compositions as set forth in the description preceeding this example.

What is claimed is:

1. A one part heat curable organopolysiloxane composition comprising by weight:
   (A) 100 parts of a vinyl substituted organopolysiloxane fluid,
   (B) 1 to 20 parts of a siloxane hydride,
   (C) an amount of a platinum group metal catalyst which is effective as a hydrosilylation catalyst and,
   (D) an amount of an inhibitor in the form of a compound having the formula,

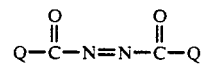

which is effective as hydrosilylation inhibitor, where Q is a member selected from R and —N—(R$^1$)$_2$, R is a C$_{(6-13)}$ aromatic organic radical and R$^1$ is a C$_{(1-13)}$ organic radical.

2. A one part heat curable organopolysiloxane composition in accordance with claim 1, where the vinyl substituted organopolysiloxane fluid is a vinyl substituted polydimethylsiloxane fluid.

3. A one part heat curable organopolysiloxane composition in accordance with claim 1, where the siloxane hydride is a methylsiloxane hydride fluid.

4. A one part heat curable organopolysiloxane composition in accordance with claim 1, where the platinum metal catalyst is a complex of platinum metal and a vinyl disiloxane.

5. A one part heat curable organopolysiloxane composition in accordance with claim 1, where the inhibitor is an azobistoluoyl.

6. A one part heat curable organopolysiloxane composition in accordance with claim 1, where the inhibitor is an azobisbenzoyl.

7. A one part heat curable organopolysiloxane composition in accordance with claim 1, where the inhibitor is an azobis(N,N'-dimethylformamide).

* * * * *